United States Patent [19]

Corfitsen

[11] Patent Number: 5,238,034
[45] Date of Patent: Aug. 24, 1993

[54] APPARATUS FOR THE AUTOMATIC FUELLING OF AUTOMOTIVE VEHICLE

[76] Inventor: Sten Corfitsen, Harrvägen 21, S-181 31 Lidingö, Sweden

[21] Appl. No.: 784,421
[22] PCT Filed: May 8, 1990
[86] PCT No.: PCT/SE90/00302
 § 371 Date: Nov. 8, 1991
 § 102(e) Date: Nov. 8, 1991
[87] PCT Pub. No.: WO90/13512
 PCT Pub. Date: Nov. 15, 1990

[30] Foreign Application Priority Data

May 10, 1989 [SE] Sweden .................. 8901674

[51] Int. Cl.$^5$ .................. B65B 1/30; B65B 31/00; B67C 3/02
[52] U.S. Cl. .................. 141/94; 141/346; 141/348; 141/350; 141/DIG. 1; 251/65; 251/69; 251/95
[58] Field of Search .................. 141/387, 388, 389, 232, 141/98, 94, 95, 96, 285, 301, DIG. 1, 346, 348, 349, 350; 251/65, 95; 901/7

[56] References Cited

U.S. PATENT DOCUMENTS

| | | | |
|---|---|---|---|
| 3,332,457 | 7/1967 | Nisbet et al. | 141/392 |
| 3,521,679 | 7/1970 | Copony | 141/208 |
| 3,527,268 | 9/1970 | Ginsburgh | 141/98 |
| 3,642,036 | 2/1972 | Ginsburgh et al. | 141/94 |
| 4,632,270 | 12/1986 | Sasaki et al. | 141/285 |
| 4,728,955 | 3/1988 | Hane | 342/140 |

FOREIGN PATENT DOCUMENTS 2526111 1/1976 Fed. Rep. of Germany .

OTHER PUBLICATIONS

The above art was cited in the International Search Report and discussed in the International Preliminary Examination Written Opinion dated Aug. 7, 1991.

Primary Examiner—Henry J. Recla
Assistant Examiner—Steven O. Douglas
Attorney, Agent, or Firm—Nies, Kurz, Bergert and Tamburro

[57] ABSTRACT

Apparatus for the automatic fueling of automotive vehicles, comprising a robot which includes a fueling pistol and which is operative, to move the fueling pistol automatically from a rest position to a vehicle fueling location. The invention is characterized in that the fueling pistol (16) includes a rigid, first tubular element (20), which is intended to be moved by the robot (1) towards a receiving plate (21) provided with a hole and forming part of the vehicle fueling location. A flexible second tube (26), is arranged within the first, rigid tube (20) for movement from a first terminal position, in which the outer free end (27) of the second tube (26) is located within the first tube (20), to a second terminal position in which the second tube projects from the first tube. A pipe connector is provided between the hole and the fuel pipe of the vehicle. The robot is intended to move the free end of the first tube (20) into abutment with the receiving plate (21), and is intended to move the free end (27) of the second tube (26) out of the first tube (20) and down into the vehicle fuel pipe, in order to pump fuel through the second tube (27) down into the vehicle fuel tank.

7 Claims, 3 Drawing Sheets

B-B

A-A

APPARATUS FOR THE AUTOMATIC FUELLING OF AUTOMOTIVE VEHICLE

BACKGROUND OF THE INVENTION

1. Field of the Invention

The present invention relates to apparatus for the automatic fueling of automotive vehicles, and particularly to the refueling of cars.

2. Description of the Related Art

It is known to refuel, inter alia, buses automatically, with the aid of an industrial-type robot having a movable arm which carries a conventionally designed fueling nozzle or pistol on the free end thereof. The buses referred to are long-distance buses and are found in a few models and designs with respect to the position of the fuel pipe on the bus and the configuration of the fuel-pipe aperture or opening. Fueling was carried out indoors, in a building corresponding to a bus garage.

Swedish Patent Specification No. 8403564-1, which corresponds with U.S. Pat. No. 4,728,955, granted Mar. 1, 1988, describes a method and apparatus for determining the mutual position of two objects. This specification states that the invention can be applied conceivably for effecting automatic refueling of cars. The primary intention with the invention described in the prior specification is to enable the fueling pistol to be positioned relative to the fuel pipe of the car concerned. The specification describes a technique in which a transmitter/receiver device functions to transmit signals of microwave frequency to a so-called transponder, which is intended to reflect signals transmitted from the transmitter/receiver device back to said device. The transponder is preferably a so-called passive transponder which does not require an energy boost in order to transmit the signals received from the transmitter/receiver device. The invention described in the aforesaid Swedish Patent Specification can be applied advantageously together with the present invention, for positioning a unit corresponding to a fueling pistol in relation to the fuel pipe of an automotive vehicle, such as a car.

In apparatus intended for the automatic refueling of automotive vehicles, and then particularly cars, the primary problem is not one of achieving alignment of the fueling pistol with the fuel pipe, since the method and apparatus taught by the aforesaid Patent Specification are well suited for achieving mutual alignment of these two components in space to a predetermined position therebetween.

The problem concerned is a different problem, mainly that there is a very large number of different makes and models of cars and therewith innumerable variations in the position of the fuel pipe, its angle to the horizontal in two mutually perpendicular directions, the configuration of the upper portion of the pipe, i.e. the part of the pipe extending immediately from its mouth, and the diameter of said pipe.

Furthermore, the fuel-pipe connection also has many different configurations. These different variants in the design or configuration of various parts also present a problem of a different character, mainly that it must be guaranteed that fuel exiting from the fueling pistol will be deposited in the fuel tank of a vehicle and not on the ground beneath.

In brief, when fueling a vehicle automatically, the vehicle is driven to an unmanned petrol station and parked within a prescribed area of, e.g. 7×3 meters, with the side of the vehicle on which the fuel pipe is situated being positioned adjacent a fueling robot. The vehicle may be positioned with the aid of known devices, which are operative to indicate to the driver those vehicle-position changes which are necessary in order for the vehicle to be brought to a permitted, predetermined position in relation to the fueling robot. An example of one such known arrangement is described below. Subsequent to the vehicle having been brought to a predetermined position, there is activated a robot which functions to advance a fueling pistol, open the fuel-pipe closure device and establish a connection between the fueling pistol and the fuel pipe. Movement of the robot in a direction towards the vehicle fueling location, i.e., the location of the fuel pipe, and accurate alignment of the fueling pistol in relation to the fuel pipe can be controlled by means of an arrangement according to the aforesaid patent specification.

Subsequent to achieving said alignment, the robot is activated to pump fuel to the fueling pistol and down into the fuel tank of the vehicle through the fuel pipe. The fueling pistol is constructed to detect when the tank is full, in a known manner, and therewith interrupt the supply of fuel to the tank. The robot is then activated so as to move away from the fuel pipe, whereafter the fuel-pipe closure device must be reclosed.

It is obvious that it is difficult to guarantee that no fuel will be pumped onto the ground instead of into the fuel tank of the vehicle, in view of the fact that the vehicles are positioned with differing degrees of accuracy and because the vehicle components concerned in such fueling operations differ widely with respect to their design and configuration.

Furthermore, the fueling apparatus must be so constructed that if, for instance, a vehicle is driven away despite the fact that refueling has not been completed, no damage will occur to the robot or to the vehicle. The apparatus must also be able to function efficiently in widely varying climatic conditions.

Since the apparatus is intended to operate without the attendance of personnel, it is extremely important that the vital parts of the robot, and particularly the parts which establish connection between the fueling pistol and the fuel-pipe of the vehicle, do not become damaged by rough handling or by violent action. If these parts are damaged, fuel may well be poured onto the ground adjacent the vehicle.

The present invention resolves the aforesaid problems, among others, and provides apparatus well suited for the automatic fueling of vehicles.

SUMMARY OF THE INVENTION

Accordingly, the present invention relates to an apparatus for the automatic fueling of vehicles in which a robot comprising a fueling pistol or like device is operative, in response to a sensing and steering arrangement, to move the fueling pistol automatically from a rest position to the vehicle fueling location when the vehicle is placed in a predetermined position relative to the robot. The fueling location includes a fuel pipe, i.e., a fuel-inlet pipe, and an openable fuel-pipe closure device. The robot, subsequent to a connection being achieved between the fuel pistol and the fuel pipe, operates to pump fuel through the fueling pistol, down into the fuel pipe and therewith into the vehicle fuel tank. The fueling pistol includes a rigid, first annular element, preferably a metal tube, intended to be moved by the robot to a receiving plate forming part of the fueling location, said receiving plate having a hole provided therein. A flexible second tube, preferably a plastics tube, is displacably arranged within the first, rigid tube for movement from a first terminal position in which the outer free end of the second tube is located within the first tube, to a second terminal position in which the second tube projects from the first tube, such that said free end of said second tube is located slightly outwards of the free end of the first tube. A tube connection is provided between said holes and the fueling pipe. The robot is constructed to move, in a first stage, the free end of the first pipe into abutment with or to a position in the immediate vicinity of said receiving plate and, in a second stage, to move the free end of said second tube out of the first tube and down into said tube connection, or into the vehicle fuel pipe, and in a third stage to pump fuel through the second tube, and down into the vehicle fuel tank and to carry out the first two stages in a reversed order upon completion of a fueling operation.

BRIEF DESCRIPTION OF THE DRAWINGS

The present invention will now be described in more detail with reference to exemplifying embodiments of the invention illustrated in the accompanying drawings, in which.

DESCRIPTION OF THE PREFERRED EMBODIMENTS

Figure 3:
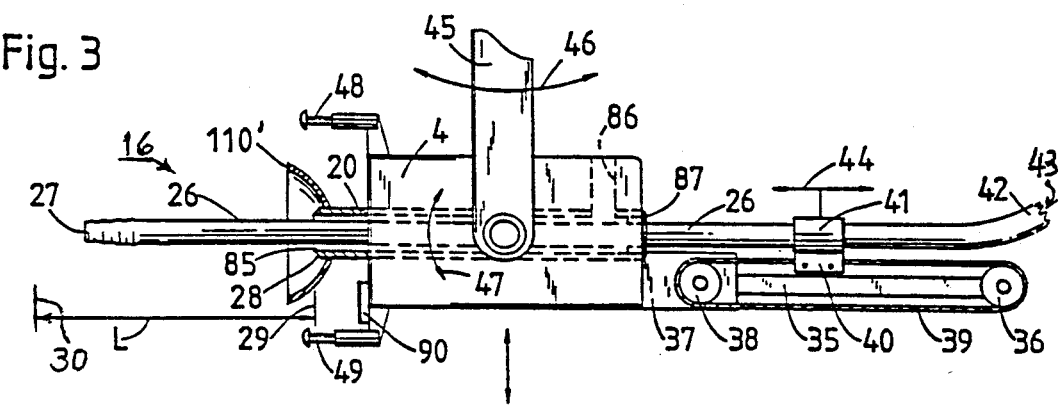
FIG. 3 illustrates schematically part of a robot constructed in accordance with the invention.
Figure 4:
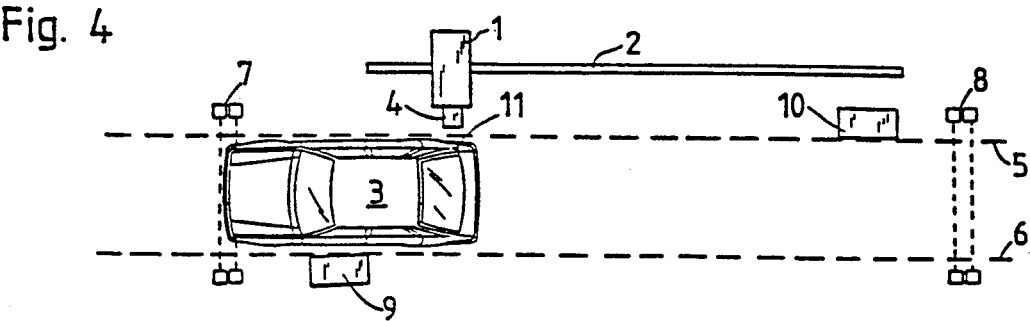
FIG. 4 illustrates schematically a fueling station in which the invention is applied.

FIG. 4 illustrates schematically a fueling station from above. The fueling station is attended by apparatus which includes a robot 1 which runs on guides 2, such as to be brought to a position parallel with the longitudinal axis of the vehicle 3. The robot is equipped with a robot head 4 capable of being moved towards and away from the vehicle 3. The robot head 4 includes a fueling nozzle or pistol 16 (see FIG. 3) or some corresponding device, and is moved automatically from a rest position to the vehicle fueling position in response to a sensing and steering arrangement, subsequent to the vehicle having been located in a predetermined position relative to the robot for instance, lines 5, 6 can be painted for the purpose of signalling to the driver of a vehicle how the vehicle shall be positioned in its transverse direction. Correction positioning of the vehicle in the direction of its longitudinal axis can be effected, for instance, with the aid of pairs of photocells 7, 8, which co-act with a suitable display, not shown, operative to inform the driver that the vehicle should be driven forwards, backwards or stopped. Such arrangements are well known and are used, inter alia, in automatic car washing facilities. The reference numerals 9, 10 designate pay machines. When the vehicle has been positioned correctly within a predetermined, permitted area, a sensing and steering arrangement causes the robot to move the fueling pistol automatically from a rest position to the vehicle fueling location. Since this sensing and steering arrangement does not form part of the present invention, it will not be described in detail here. The sensing arrangement used may conveniently be of the kind described in the aforesaid Patent Specification. In this case, the robot head 4 will include a transmitter/receiver unit and the vehicle will include a transponder positioned close to the fueling location. The steering or control arrangement is conveniently of a known kind for controlling robots, which in this case is intended to receive signals from the transmitter/receiver unit in the form of robot-control input signals. The vehicle fueling location 11 includes a fuel pipe 12; 13 and an openable fuel-pipe closure device 14; 15, see FIGS. 1 and 2. The robot is constructed to pump fuel through the fueling pistol, into the fuel pipe and therewith down into the vehicle fuel tank, subsequent to achieving connection between the fueling pistol 16 and the fuel pipe 12; 13.

Figure 1:
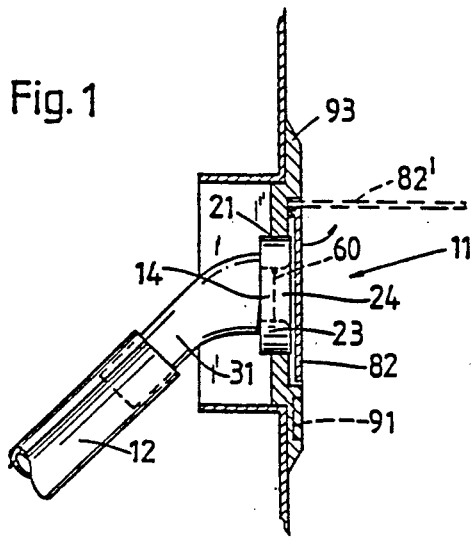
FIG. 1 illustrates a first embodiment of a so-called adapter located between the outer side of a vehicle and the fuel pipe.
Figure 2:
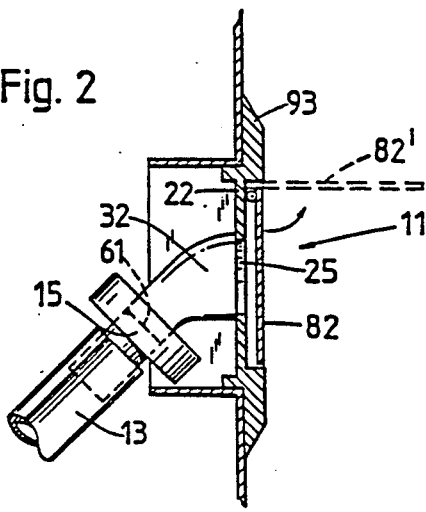
FIG. 2 illustrates a second embodiment of an adapter.

In accordance with the invention, the fueling pistol 16 includes a rigid, first tubular element 20, preferably a metal tubular element, which is intended to be moved by the robot to a position adjacent a receiving plate 21; 22 forming part of the vehicle fueling location, see FIGS. 1 and 2. The first tubular element 20 need not be an impervious tube, but may consist, for instance, in a number of mutually parallel guide strips which together form a cylinder-like guide tube. The essential function of the tubular element 2D is to guide a second tube 26.

Figure 5:
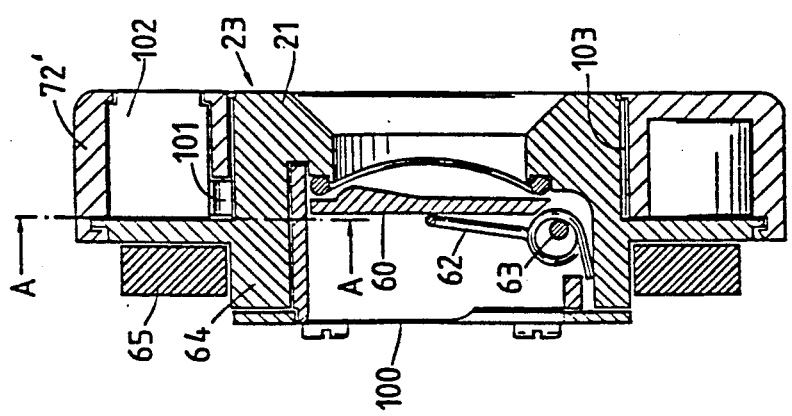
FIG. 5 is a sectional view of the adapter shown in FIG. 1.
Figure 8:
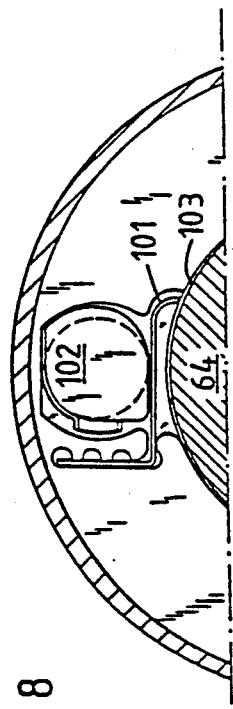
FIG. 8 is a view taken on the line A—A in FIG. 5.
Figure 9:
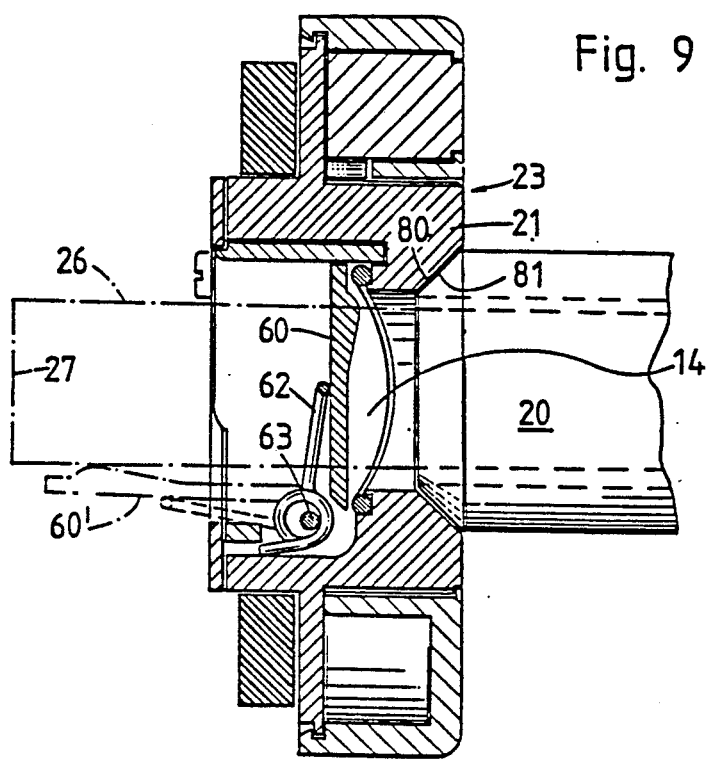
FIG. 9 is a sectional view of the adapter shown in FIG. 1 and shows a part of a tube carried by the robot.

In the case of the FIG. 1 embodiment, the receiving plate 21 forms part of an adapter 23, a sectional view of which is shown in larger scale in FIGS. 5 and 9. FIG. 2 illustrates a modified receiving plate 22. The receiving plate 21; 22 is perforated with a hole 24; 25, said first guide tube 20 being intended to be positioned concentrically with said hole by means of the robot head 4. A flexible, second tube 26, preferably a plastics tube, is displaceably mounted within the first, guide tube 20. The second tube 26 can be displaced from a first terminal position, in which the outer free end 27 of the tube 26 is located within the first tube 20, to a second terminal position, in which the second tube projects from the first tube, such that said free end 27 of said second tube will be located slightly outwards of the free end 28 of the first tube 20. The first terminal position of free end is indicated in FIG. 3 by the broken line 29, whereas the second terminal position is indicated by the broken line 30. Thus, the second tube 26 can be displaced from the first tube 20 through a total distance L.

A pipe connection 31; 32 is provided between said holes 24; 25 and the fuel pipe 12; 13. This pipe connection can be completely impervious, or may also solely be configured to form a guide operative to steer the second, flexible tube into the fuel pipe, as hereinafter described.

The robot 1 is constructed to move, in a first stage, the free end 28 of the first tube 20 into abutment with, or to a position in the immediate vicinity of the receiving plate 21; 22, with the aid of said robot head 4, and in a second stage to move the free end 27 of the second tube 26 out of the first tube 20, and down into said pipe connection 31; 32. In a third stage, the robot functions to pump fuel through the second tube 26, down into the pipe connection 31; 32 or the fuel pipe 12; 13 and therewith into the vehicle fuel tank. The robot then carries out the two first mentioned stages in a reversed order, upon completion of a fueling operation.

FIG. 3 illustrates schematically an arrangement for moving the second tube 26 out of the first tube 20. This arrangement includes a non-driven chain wheel 36 and a driven chain wheel 38 driven by means of an electric motor 37, and a chain 39. An attachment device 40 is attached to the chain 39. The attachment device is also connected to a coupling 41 between the second tube 26 and a hose 42 or corresponding device. The hose 42 extends to a fuel tank from which fuel is pumped to the vehicle in the direction of the arrow 43. The attachment means 41 can thus be moved in the direction of the double-headed arrow 44, by means of said drive means.

The robot head 4 is mounted by means of a cardanic suspension device 45, so as to be readily movable in both the horizontal and vertical planes, as illustrated by arrows 46 and 47 respectively. A number of spring-biased arms project from the forward part of the robot head, of which two arms 48, 49, are shown in FIG. 3. Suitably, four arms are provided which, seen in a view from the left in FIG. 3, are each seated in a respective corner of a square. Microswitches are preferably connected to the arms 48, 49. These arms, in combination with the cardanic suspension of the robot head, cause the robot head to be automatically positioned in parallel with the outer surface of the vehicle at the vehicle fueling location 11, when the robot head is moved into abutment with the vehicle by said robot. As will be understood, it is the outer parts of respective arms 48, 49 which come into abutment with the vehicle. The microswitches function to deliver signals to the robot control system and therewith provide information as to whether or not all arms are in abutment with the vehicle.

Located between the receiving plate 21; 22 and the fuel pipe 12; 13 is a hole 14; 15 which is provided with a closure device in the form of a flap 60; 61, which can be opened against a spring force. The flap 60; 61 is opened by the free end 27 of the second tube 26 as said end is moved out of the free end of the first tube.

FIG. 1 illustrates an adapter 23 which includes one such flap 60. The flap 60 can be moved to the position 60' shown in chain lines, in response to pressure exerted by the free end 27 of the second tube 26 as said tube is advanced from right to left in FIG. 9. The flap 60 is suspended on a spring 62 mounted on a shaft 63.

FIGS. 5-8 illustrate the adapter in various different sections and views. The reference numeral 64 identifies an adapter body and the reference numeral 65 a packing.

Figure 6:
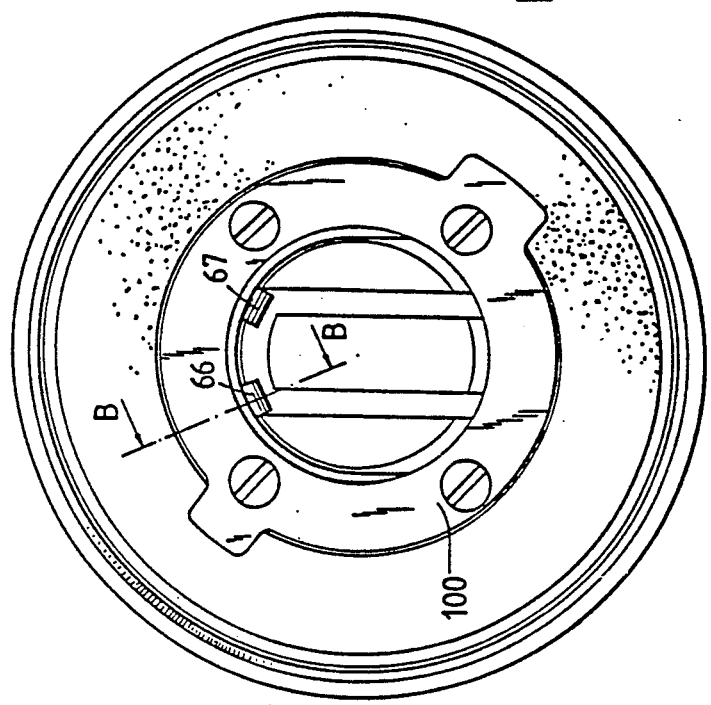
FIG. 6 illustrates the adapter shown in FIG. 5, seen from the left in FIG. 5.
Figure 7:
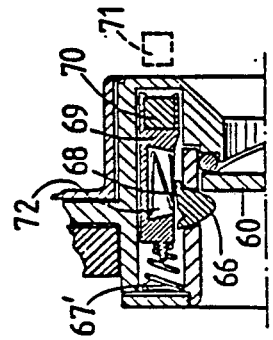
FIG. 7 is a sectional view taken on the line B—B in FIG. 6.

In accordance with one preferred embodiment, the flap 60 is provided with a lock capable of being opened by means of a magnetic force. FIG. 7 is a sectional view taken on the line B—B in FIG. 6. The upper peripheral part of the flap is normally held locked with the aid of a lock hook 66. The arrangement may comprise two such lock hooks 66, 67, as illustrated in FIG. 6. In FIG. 7, the reference numeral 67' identifies a spring, the reference numeral 68 identifies a further spring, the reference numeral 69 identifies a slide, and the reference numeral 70 a magnet. When the magnet 70 is repelled by a further magnet 71, the slide will move to the left in FIG. 9, wherewith the flap periphery is able to press the lock hook 66 into a recess 72 in the slide. The magnet 71 is preferably mounted on the forward part of the first tube 20, such that the magnet 71 will be located in the position shown in FIG. 7 when the first tube 20 comes into abutment with the receiving plate 21, therewith unlocking the flap. As a result of the configuration and positioning of the lock hook, when resting against the spring 68 the lock hook can be depressed when the flap moves from its open position and to the right in FIG. 7, even when the slide occupies the position shown in FIG. 7. The flap can thus always be closed, but can only be opened when the magnet 70 is repelled by the magnet 71, such that the slide will be displaced to the left in FIG. 7.

In that case when the adapter equipped with such a lockable flap 61 is placed adjacent the upper orifice of the fuel pipe, as illustrated in FIG. 2, a magnet is mounted at the mouth or orifice of the second tube.

It will be understood, however, that the flap 60; 61 need not necessarily be lockable.

According to one embodiment, an outer part 72' is rotatably attached to the adapter body 64. As shown in FIG. 6, a bayonette plate 100 is provided on the left side of the adapter in FIG. 5. This bayonette plate is intended to co-act, in a known manner, with a second half of a conventional bayonette fitting, this second half of said fitting being mounted in the upper part of the connecting pipe 31. This fitting thus enables the whole of the adapter illustrated in FIG. 5 to be removed. The need to remove the adapter is found when the flap can be locked with the aid of a magnetic lock and fueling of the vehicle is effected manually. As before mentioned, the part 72' is rotatable in relation to the body 64. A lock 101, 102 is provided for locking said outer part 72' relative to the body 64, such locking being effected when the element 102 is rotated so that the lock element 102 is in abutment with the periphery 103 of the body 64. Although not shown, the periphery 103 is serrated. When said outer part 72' is locked in relation to the body 64, the adapter can be released from the connector pipe, by grasping said outer part and releasing the bayonette fitting.

FIG. 9 illustrates the embodiment also illustrated in FIG. 1. According to one preferred embodiment, the receiving plate 21 is provided with a conically bevelled part 80 in the region around said hole 14. The free end of the first tube 20 is provided with a corresponding conical bevelling 81. As a result, final alignment of the first tube with the receiving plate will be achieved very accurately.

FIG. 9 illustrates a position in which the second tube 26 has just moved past the adapter flap 60. Prior to commencing fueling of the vehicle, the second tube is advanced further down towards the fuel pipe. According to one preferred embodiment, the second tube 26 is arranged to project slightly from the first tube, through a distance of about 100-300 mm. In this case, it is preferred that the second tube projects through a distance such that the mouth of said tube will be located within the fuel pipe.

According to one particularly advantageous embodiment, the second tube 26 is arranged to project out from the first tube 20 through a distance such that the free end 27 of said second tube will be located in the vehicle fuel tank. This embodiment enables high-pressure fueling of the vehicle to be effected, where the fuel can be pumped under high pressure and therewith rapidly into the vehicle fuel tank. For instance, a tank having a capacity of 60 liters can be filled in about 30 seconds.

Figure 10:
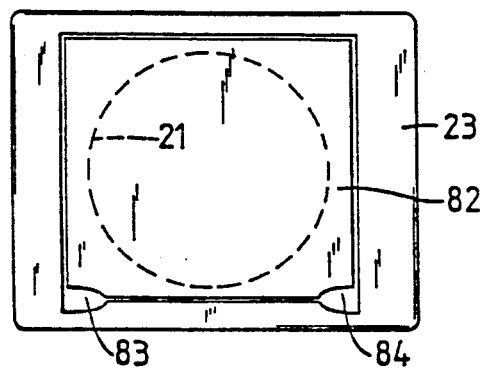
FIG. 10 is a plan view of an adapter with an associated flaps.

The embodiment illustrated in FIGS. 1 and 2 includes an openable, outer flap 82 which is connected with the receiving plate 21; 22 and which covers said plate when in its closed position. The flap is shown in its open position 82 in chain lines. FIG. 10 is a view from above of an adapter provided with said flap. The flap may, for instance, be hinged at its upper edge and provided with recesses 83, 84 at its lower corners, so as to enable the flap to be gripped in order to open the same.

The robot head 4 is provided with an opening arrangement, in the form of one or more outwardly pivotable arms (not shown) intended for co-action with the recesses 83, 84 for the purpose of opening the flap 82 when the end of the first tube 20 is located a short distance from the receiving plate.

According to another preferred embodiment of the invention, a radial gap 85 is provided between the first tube 20 and the second tube 26. The end of the gap 85 located nearest the robot communicates with a device for collecting and condensing fuel vapour. FIG. 3 shows in broken lines a pipe 86 which communicates with said gap and which functions to convey fuel vapour to a collecting and condensing facility. The gap is sealed with the aid of a seal 87 located between the first and the second tubes. A rubber cuff 110' may be provided adjacent the outer end of the first tube, so as to seal against the vehicle, see FIG. 3.

As mentioned in the introductory paragraphs, an aligning and control system, according to the aforesaid Patent, can be used advantageously together with the present invention. Thus, the transmitter/receiver unit 90 can be positioned in the manner illustrated in FIG. 3, and the transponder 91 positioned in the casing in which the adapter is carried, see FIG. 1.

Figure 11:
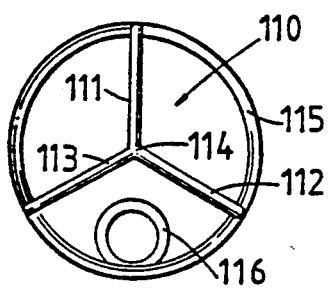
FIG. 11 is a plan view from the front of an element attached to a second tube.
Figure 12:
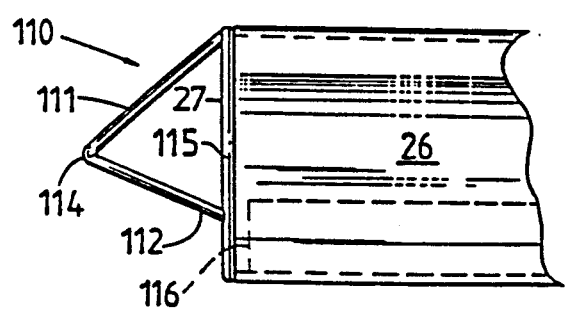
FIG. 12 is a side view of the construction illustrated in FIG. 11.

According to one preferred embodiment, the free end 27 of the second tube 26 has fitted thereto an alignment arrangement 110 which eliminates the need of accurately aligning the first tube 20 with the receiving plate. This arrangement 110 includes three legs 111–113 which project from the mouth of said second tube and which extend to a point 114 on the longitudinal axis of the second tube and externally of the free end 27. The other ends of respective legs 111–113 can be attached to an annulus 115, which is in turn attached to the mouth of the second tube 26. As a result of this arrangement, when aligning the fueling pistol, it suffices that the point 114 falls within an imaginary cylindrical surface projected geometrically from the hole 24, 25 in the receiving plate and having the same diameter as said hole. FIGS. 11 and 12 illustrate a pipe 116 forming part of a conventional overfill guard.

The casing 93 is vehicle-specific, due to the fact that the fueling locations of different vehicles have mutually different configurations. Referring back to FIGS. 1 and 2, the connecting pipe 31; 32 may either be made of a relatively rigid material, wherewith this part must also be vehicle-specific, or may be made of a flexible material, so as to enable a connecting pipe to be fitted to different makes of vehicle.

In accordance with the present invention, the second tube 26 is positioned within the first tube 20 When not in use, so as to be protected within said second tube. When fueling a vehicle, the first tube is aligned accurately with the vehicle. The second tube 26 is then guided down into the fuel pipe, by means of the connecting pipe, wherewith said second tube, due to its flexibility, slides easily down into the fuel pipe, irrespective of the curves and angles contained in the path from the hole 24; 25 of the receiving plate to the fuel pipe.

Thus, it is ensured by the present invention that the tube, i.e., the second tube, from which fuel flows during a fueling operation will always be located down in the fuel pipe or in an impervious connecting pipe. The most significant characteristic feature for achieving this, is that alignment of the fueling pistol with the vehicle is effected with the aid of a rigid, tubular element 20 in combination with movement of the flexible tube 26 out of the rigid tube 20 and that said flexible tube is guided down towards the fuel pipe.

The present invention avoids all of the drawbacks and problems mentioned in the introduction. The robot can be used for fueling, for instance, essentially all cars available on the market, where only the casing 93 and possibly the connecting pipe are car specific.

Because of the flexibility of the second tube in combination with the cardanic suspension of the robot head, the robot will be swung to one side and the second tue withdrawn from the fueling location of the vehicle should the vehicle be driven away before fueling is completed, without damage to either the robot or the vehicle. In the event that the vehicle is driven away before fueling is completed, the aforesaid microswitches will be activated. Activation of the microswitches while a vehicle is being fueled will cause the control arrangement to interrupt immediately the supply of fuel to the second tube 26.

It will be understood that the invention is not restricted to the described and illustrated embodiments thereof and that modifications and changes obvious to the person skilled in this art can be made. For instance, the robot and robot head may have other configurations. The adapter and its lockable flap may also have a different configuration. Furthermore, the arrangement by means of which the second tube is driven relative to the first tube may also have a different configuration.

The present invention is therefore not restricted to the aforesaid and illustrated embodiments, since variations can be made within the scope of the following claims.

I claim:

1. Apparatus for the automatic fueling of automotive vehicles, said apparatus comprising: a robot, a fueling nozzle carried by the robot, sensing and steering means operative to control movement of the robot and to move the fueling nozzle automatically from a rest position to a position adjacent a fuel inlet on a vehicle subsequent to said vehicle having been positioned in a predetermined position relative to said robot, a vehicle fuel inlet including a receiving plate having a hole into which the fueling nozzle can be inserted and including a fuel pipe, a pipe connector extending between said hole and the fuel pipe, and an aperture positioned between the receiving plate and the fuel pipe, the aperture including a normally closed, spring biased closure device that can be opened by pressing against the closure device to overcome the spring force, said robot communicating with a source of fuel to deliver fuel through the fueling nozzle down into the fuel pipe and therewith into the vehicle fuel-tank after connection between the fueling nozzle and the fuel inlet has been established, wherein the fueling nozzle includes a rigid, first tubular element movable by the robot towards the hole in the receiving plate, a flexible second tube displaceably arranged within the said rigid, first tubular element from a first terminal position in which an outer free end of the second tube is located within the first tubular element to a second terminal position in which the second tube projects from the first tubular element a distance such that said free end of the second tube is located slightly outwards of a free end of said first tubular element; and wherein the free end of the first tubular element is movable by the robot into position immediately adjacent the hole of said receiving plate and wherein the free end of the second tube is movable out of the first tubular element and into said pipe connector to communicate with the fuel tank of said vehicle, and to deliver fuel through the second tube and into the vehicle fuel tank; and wherein said robot is operable to withdraw said second tube from the fuel inlet upon completion of a fueling operation.

2. Apparatus according to claim 1, wherein the receiving plate has a conically bevelled part around said hole; and wherein the free end of the first tubular element is provided with a corresponding conical bevel.

3. Apparatus according to claim 1, wherein the second tube is movable relative to the first tubular element through a distance of about 100–300 mm.

4. Apparatus according to claim 1, wherein the second tube is movable relative to the first tubular element through a distance sufficient to position the free end of the second tube in the vehicle fuel inlet.

5. Apparatus according to claim 1, wherein the receiving plate carries an openable flap which covers said plate when the flap is in its closed position; and wherein the robot includes an opening means operative to open said flap when the free end of the first tubular element is located adjacent to the receiving plate.

6. Apparatus according to claim 1, wherein the closure device includes a flap which is hingedly connected relative to said aperture; and wherein the flap includes a magnetically operated lock.

7. Apparatus according to claim 1, wherein a radial gap separates the first tubular element and the second tube, and wherein the apparatus includes collecting means for collecting and condensing fuel vapor, and communication means extending from an end of said gap located nearest the robot to the collecting means.

* * * * *